Figure 5:
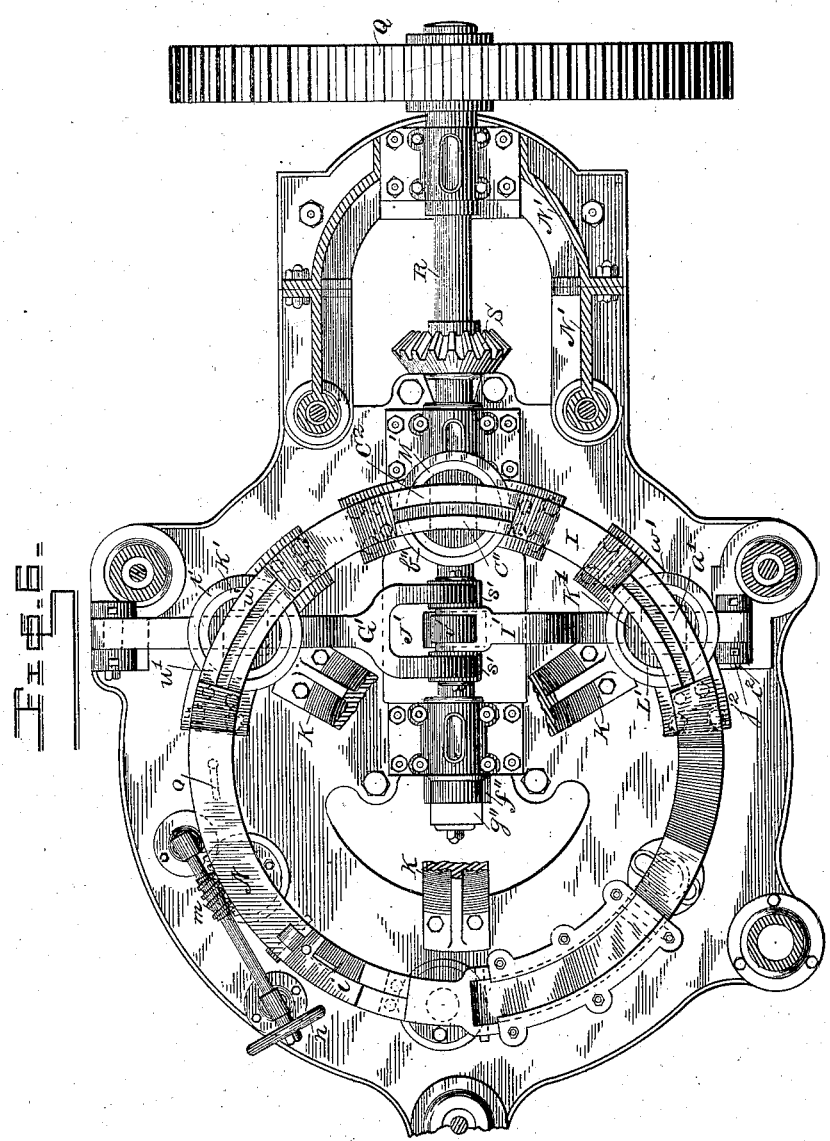

(No Model.) 7 Sheets—Sheet 1.
W. L. GREGG.
BRICK MACHINE.
No. 385,614. Patented July 3, 1888.
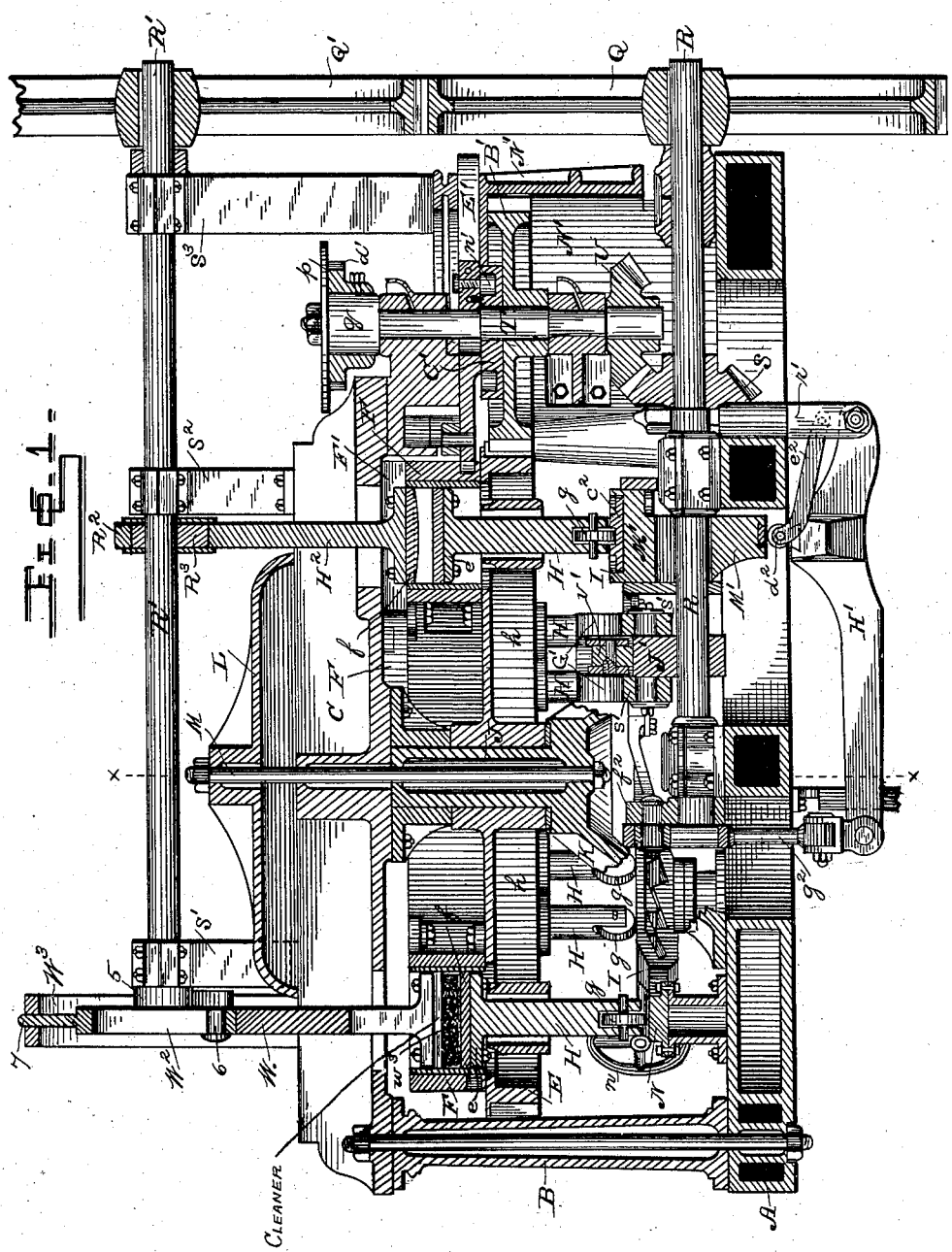
Witnesses.
Jos. H. Blackwood.
Warder Voorhees.
Inventor,
William L. Gregg
by Wm. H. Doolittle
Attorney (No Model.) 7 Sheets—Sheet 2.
W. L. GREGG.
BRICK MACHINE.
No. 385,614. Patented July 3, 1888.
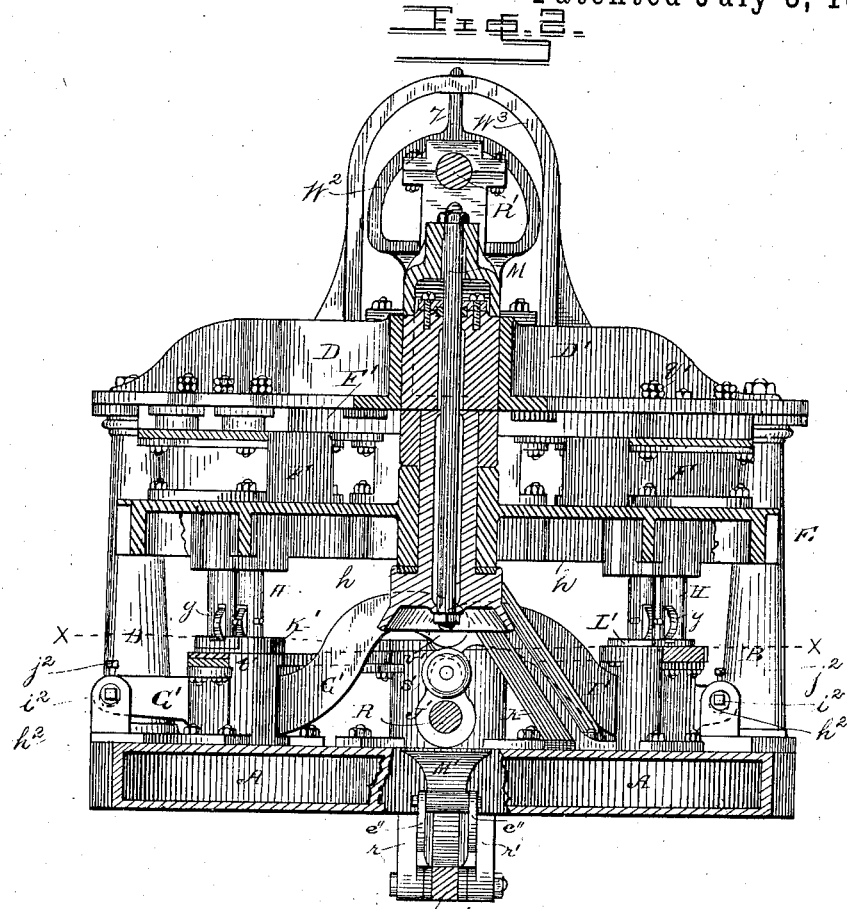
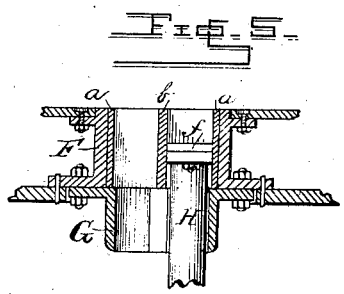
Witnesses,
Jos. H. Blackwood
Warder Voorhees.
Inventor,
William L. Gregg
by Wm. H. Doolittle
Attorney.

(No Model.) 7 Sheets—Sheet 3.
W. L. GREGG.
BRICK MACHINE.
No. 385,614. Patented July 3, 1888.
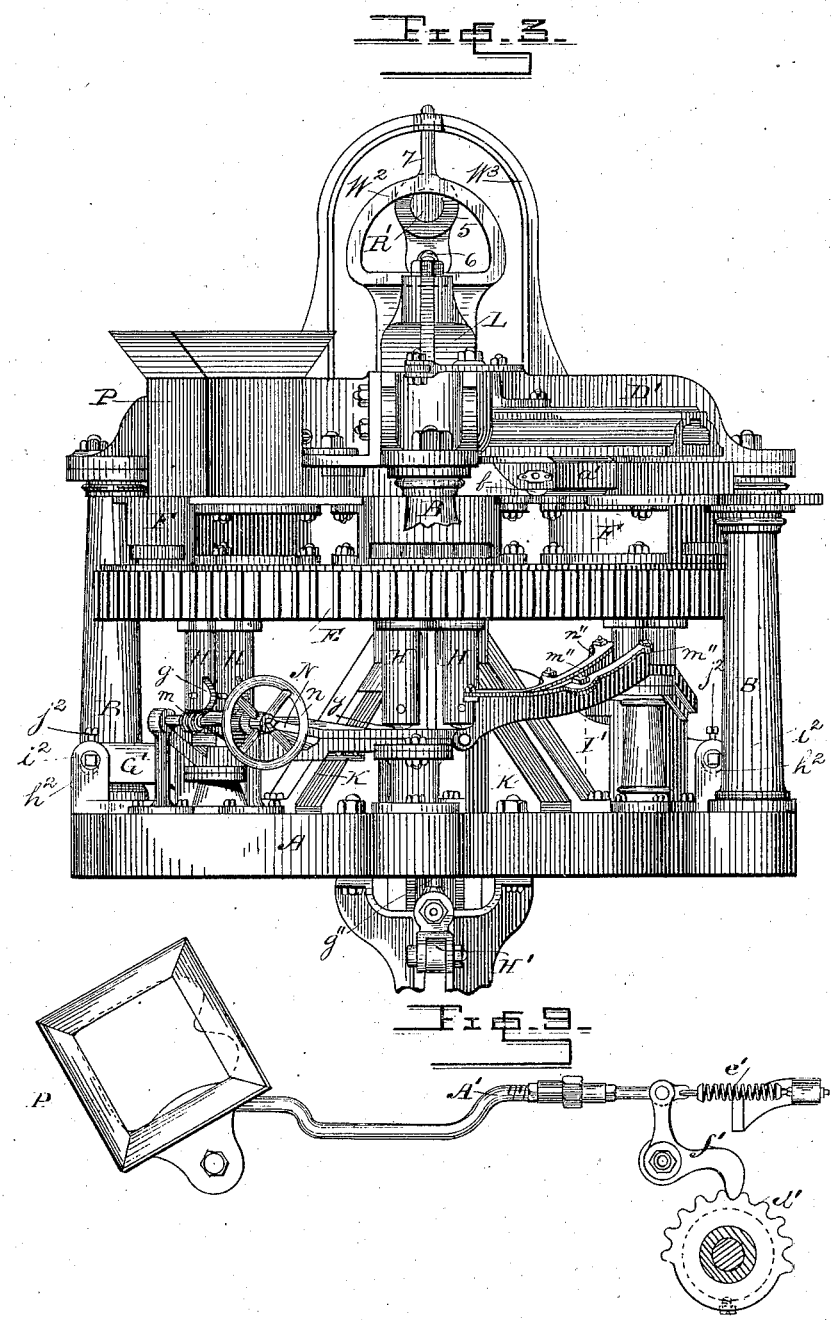
Witnesses,
Jas. H. Blackwood
Warder Voorhees
Inventor.
William L. Gregg.
by Wm. H. Doolittle
Attorney.

(No Model.) 7 Sheets—Sheet 4.
W. L. GREGG.
BRICK MACHINE.
No. 385,614. Patented July 3, 1888.
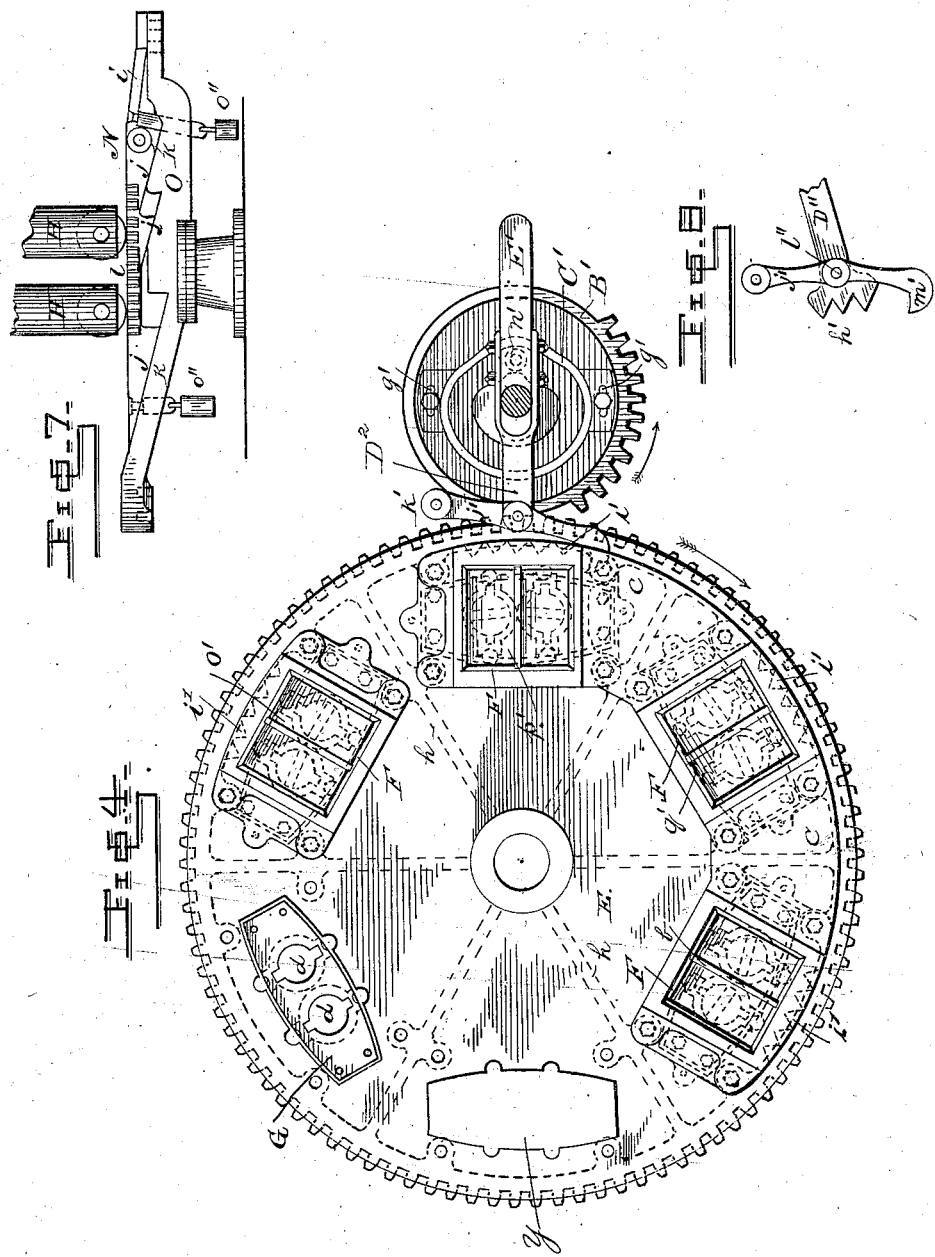

(No Model.)  W. L. GREGG.  7 Sheets—Sheet 5.
BRICK MACHINE.

No. 385,614.  Patented July 3, 1888.

Witnesses:
Jos. H. Blackwood
Warder Voorhees.

Inventor.
William L. Gregg,
by Wm. H. Doolittle,
Attorney.

(No Model.) 7 Sheets—Sheet 6.
W. L. GREGG.
BRICK MACHINE.
No. 385,614. Patented July 3, 1888.
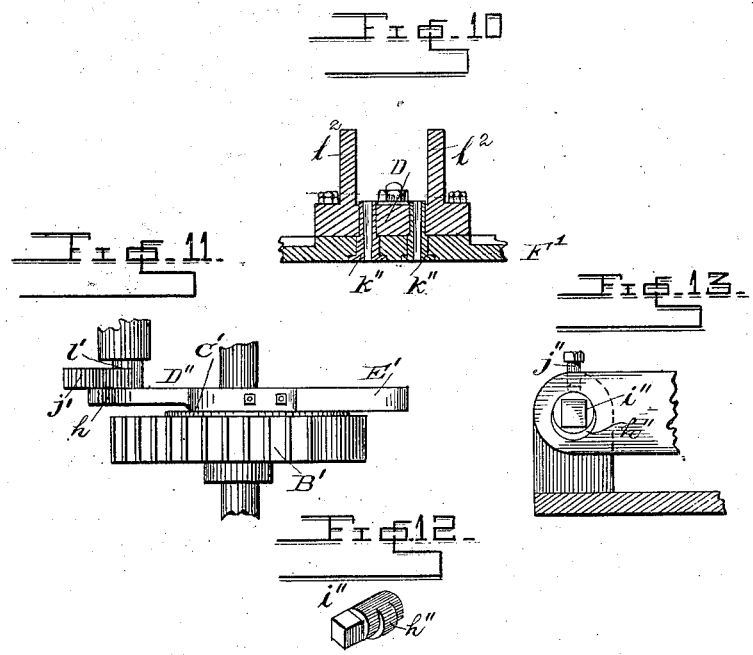
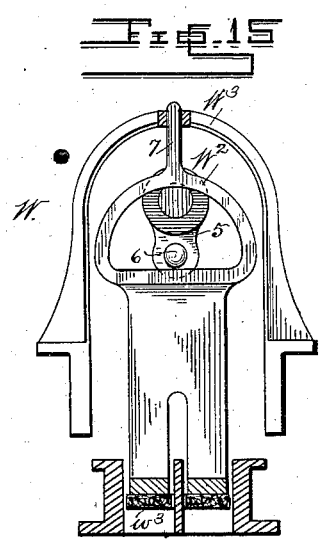
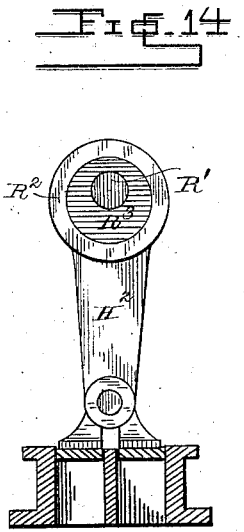
Witnesses.
Jos. H. Blackwood.
Warder Voorhees.
Inventor.
William L. Gregg.
by Wm. H. Doolittle
Attorney.

(No Model.)  W. L. GREGG.  7 Sheets—Sheet 7.
BRICK MACHINE.

No. 385,614.  Patented July 3, 1888.

WITNESSES,  INVENTOR,
Jas H Blackwood  William L Gregg
  By Wm H Doolittle
    Attorney.

UNITED STATES PATENT OFFICE.

WILLIAM LAMPAS GREGG, OF PHILADELPHIA, PENNSYLVANIA.

BRICK-MACHINE.

SPECIFICATION forming part of Letters Patent No. 385,614, dated July 3, 1888.

Application filed August 6, 1887. Serial No. 246,294. (No model.)

*To all whom it may concern:*

Be it known that I, WILLIAM LAMPAS GREGG, a citizen of the United States, residing at Philadelphia, in the county of Philadelphia and State of Pennsylvania, have invented certain new and useful Improvements in Brick-Machines; and I do hereby declare the following to be a full, clear, and exact description of the invention, such as will enable others skilled in the art to which it appertains to make and use the same.

My invention relates to improvements in that class of brick-machines which are provided with an intermittently-rotating mold-table and mold-boxes having followers for giving the clay successive pressures in the molds, and devices for removing the bricks when pressed.

The object of my improvements is to vary the character of the successive pressures, thereby producing a complete, homogeneous, and finished brick, and avoiding the necessity of re-pressing.

To this end it consists of the means, as hereinafter described and claimed, for giving to the clay, first, a developing upward pressure in the molds, whereby the brick is developed and air and surplus clay removed; then a second simultaneous downward and upward pressure, which gives to the brick a solid uniform compact quality and shape, and, finally, a third upward pressure to further solidify the brick and give it a smooth hard-finished form and condition.

The method herein involved is made the subject of my application, No. 370,044.

It also consists of means for cleansing the molds co-operating with the means for moving and filling them.

My improvement is illustrated in the accompanying drawings, in which—

Figure 16:
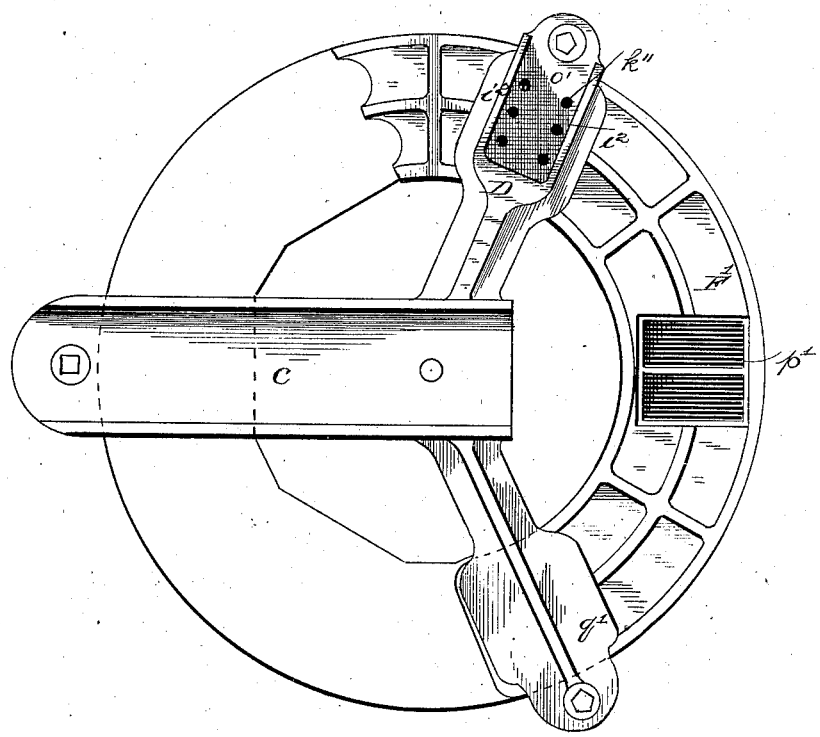

Figure 1 is a vertical longitudinal section of the machine. Fig. 2 is a vertical cross-section on line $x$ $x$ of Fig. 1; Fig. 3, an end view; Fig. 4, a top view of the mold table and boxes, two of the boxes being removed; Fig. 5, a detail, being a vertical section through one of the mold-boxes. Fig. 6 is a horizontal section on line $x$ $x$ of Fig. 2, also showing some parts above that line; Fig. 7, a detail, being a side view showing the movable portion of the track and its support. Fig. 8 is a detail, being a plan of the lock and latch. Fig. 9 is a detail showing a device for agitating the hopper. Fig. 10 is a detail showing the continuous tubes through which the surplus clay is discharged from the molds. Fig. 11 is a detail, being a side view of the period-gear and lock and latch. Fig. 12 is a detail showing the eccentric pin used as a fulcrum for the pressure-levers. Fig. 13 is a detail showing one of the pressure-levers on the eccentric pin; Fig. 14, a detail showing a cam mechanism for operating the upper follower; Fig. 15, a detail of the mold-cleaning mechanism, and Fig. 16 a detail of the plate F'.

In the drawings, A represents the bed-plate.

B are three posts rising from the bed-plate.

C is the main truss, one end of which rests upon one of the posts B, and is secured by a bolt passing through the post and bed-plate.

D D' are two branch trusses bolted at one end to the main truss, with their other ends resting upon two of the posts B and secured thereto by bolts which pass through the posts and bed-plate.

E is a mold-table provided with gear upon the periphery, and is provided, as shown, with six mold-boxes, F, each of which, as shown, is double. The table is provided with openings, over which the mold-boxes are placed, one of which is shown at $y$. The mold-boxes are secured to the mold-table, as indicated in Fig. 4. As shown, each box is provided with a steel lining, $a$, and a partition, $b$.

$c$ are metal plates which are bolted to the tops of the mold-boxes.

G, Fig. 4, are guides for the follower-stems, which guides are made independent and are secured to the bottoms of the mold-boxes by means of bolts. These guides are provided with recesses $d$ to permit the insertion from above of the rollers at the lower end of the follower-stems.

H H² are the followers. As shown, a follower consists of a head, $e$, on the stem of which is secured a removable plate, $f$. The lower end of each follower-stem H is provided with a roller, $g$.

I is a track for the rollers $g$.

The mold-table is provided with strengthening-ribs $h$ on the under side and with a hub at the center, which rotates upon a pivot, J, supported by three legs, K, the lower ends of which are bolted to the bed-plate.

L is a hood on top of the main truss, held in place by the center bolt, M, the object of the hood being in part to take a portion of the strain from the bolts which connect the branch trusses with the main truss.

I make a portion of the track upon which the rollers $g$ travel adjustable vertically for the purpose of regulating the amount of clay to be fed to the molds.

N, Fig. 6, represents the main part of this portion of the track. $i$ is the other part, which is hinged to N. The under side of this part N is, as shown, provided with three inclines, $j$, which rest upon three corresponding inclines, $k$, in the support O. On the side N is a rack, $l$, with which a worm-screw, $m$, engages, which worm can be operated by a hand-wheel, $n$. By rotating this worm-wheel the movable part N can be raised and lowered, the inclines $j$ moving up and down on the inclines $k$. By raising or lowering this part N the position of the lower followers, H, when at rest in the mold-boxes, can be varied for the purpose of regulating the amount of clay to be fed to the mold-boxes. The main part of the hinged piece $i$ is only half the width of the track, and at this point one-half of the wheels $g$ will have a support in whatever position the part $i$ be placed. When the part N is at its lowest position, this part $i$ will be horizontal. As the part N is raised the part $i$ assumes an inclined position. N is provided with a slot, $o$, Fig. 6, into which passes a pin which serves as a guide.

P is a hopper pivoted to the machine.

Q, Fig. 6, is a gear-wheel driven by a pinion. (Not shown.)

R is the main shaft, driven by the wheel Q.

S is a miter-wheel on the shaft R.

T, Fig. 1, is a vertical shaft, on the lower end of which is a miter-wheel, U, engaging with the miter-wheel S.

$p$ is a face-plate on the top of hub $q$, which hub is keyed to the shaft T.

$d'$ is a mutilated pinion secured to the hub $q$. (See Figs. 1 and 9.)

A', Fig. 9, is a rod connected at one end to the pivoted hopper and at the other end to the coiled spring $e'$.

$f'$ is a lever, one end of which is pivoted to the bar A' and the other end engages with the teeth of the mutilated pinion $d'$.

B', Fig. 4, is a mutilated pinion engaging with the mold-table, and being so arranged that one revolution of the pinion B' gives to the mold-table one-sixth of a revolution.

C' is a cam, which is bolted to this mutilated gear. The plate which carries the cam is provided with slots $g'$, so that the cam can be adjusted on B'.

D'' is a bar forked at its outer end, and having upon its inner end, as shown, three teeth, $h'$, which engage with notches $i'$, of which, as shown, there are five in the side of the mold-boxes.

E' is a bar which is bolted to the fork of D'.

$j'$ is a latch, pivoted at $k'$ to the frame and at $l''$ to D'', which latch has a hook, $m'$, at its free end.

$n'$ is a roller supported on a pin which is bolted to E', the roller being arranged in the groove of the cam C', Figs. 1 and 4.

F' is a counter-pressure plate, against which the brick are pressed from below. This plate extends from a point near the hopper around to the opposite side of the machine as far as required. The parts of this plate which are between those parts which receive the pressure are cut away somewhat, as shown in the drawings, to save metal, and also at its central portion, in order to admit of the action of the intermediate upper pressure-followers.

There are three pressure-levers—G', Fig. 2, H', Fig. 1, and I', Fig. 2—to operate the lower followers. G' and I' are pivoted at their outer ends to the frame, as shown in Fig. 2. H' is pivoted to a hanger, $r'$, Figs. 1 and 6. The lever G' is operated by a cam, J', on the shaft R, which cam has pivoted to it two rollers, $s'$, which are arranged under and come in contact with the inner end of the lever G', which is forked, (see Figs. 1 and 6,) raising the same as the shaft R rotates, and thereby raising the pressure block or piston K', which is located in a casing or cylinder, $t'$, the casing and piston both being slotted for the passage of the lever G'. This casing $t'$ is provided with flanges on opposite sides at the bottom and also near the top. The bottom flanges are bolted to the bed-plate and the upper flanges are bolted to the track. That part of the track lettered $u'$ is disconnected from the remaining portion, and is let into the pressure-block K' and rises and falls with it, recesses being provided in the top or upper edge of the casing $t'$ to receive $u'$. The inner end of the pressure-lever I' passes into the forked end of the lever G', and is provided with a roller, $v'$, and this lever is operated by the main body of the cam J', which comes in contact with the roller $v'$, the other lever, G', being operated, as before stated, by the same cam, J', through the rollers $s'$. (See Figs. 1 and 6.)

$w'$ is a casing similar to $t'$.

L' is a pressure block or piston similar to K'.

$a'$ is a movable piece of track similar to $u'$.

$b''$ is another casing similar to $t'$.

M' is a pressure-block similar to K'.

C² is a movable piece of track similar to $u'$.

The pressure-block M' extends down below the shaft, and is provided with a large passage, through which the main shaft R passes. This pressure-block rests at its lower end on a roller, $d''$, in arms $e''$, pivoted to the hanger $r'$, which roller rests on an upward projection from the lever H'. This lever is operated by means of a crank, $f'''$, secured to the shaft R, and a pitman, $g'''$. (See Figs. 1 and 6.) The levers G' H' J' are each supported on an eccentric, $h''$, on a pin, $i''$, and by changing the position of the pin the lever can be slightly raised or lowered, and the pin $i''$ can be held in any desired position by a set-screw, $j''$, or other device.

$H^2$ is an upper follower for giving a downward pressure against the upward pressure given by the lower middle follower, H. It is shown in detail in Fig. 14. It is keyed onto an upper shaft, R', by means of a strap, $R^2$, and carries an eccentric, $R^3$. The shaft R' has its bearings in standards S' $S^2$ $S^3$, which are bolted to the main truss and to the housing. Q' is a wheel mounted on shaft R', gearing with driving-wheel Q on the lower main shaft. The gears just mentioned having the same number of teeth, and the bottom followers being driven by shaft R, it follows by this arrangement that a simultaneous top and bottom pressure is given by the top and bottom followers, H $H^2$.

W is a swab for cleaning and oiling the molds, and is shown in detail in Fig. 15. It is provided on its upper end with a yoke, $W^2$, and at the lower end is divided into followers extending into the molds, and carrying at their ends and sides cleaning material, such as sheep-skin or sponge, $w^3$. The swab is driven by a crank, 5, and crank-pin 6, working in the yoke $W^2$. The yoke is provided with a stem, 7, guided by an arched standard, $W^3$, bolted firmly to the main truss. When operated, the swab will be pressed into the molds against the head of a follower, so that any particles of clay or dust adhering to the sides of the mold or to the follower-head will be removed thereby and the molds at the same time oiled.

N' is a housing which stiffens the frame and incloses the mutilated gear and furnishes protection against injury therefrom. This housing is secured to the bed-plate and extends upward therefrom. (See Figs. 1 and 6.)

$k''$ are tubes secured in the pressure-plate F' and extending up through the truss D, for the passage of surplus clay under the first pressure. This truss is provided with upwardly-extending projections, $l^2$, which form a partial box to receive the discharged surplus clay. (See Fig. 10.) The pins which support the rollers at the lower end of the follower-stems project a little beyond such stems, and the ends of these pins, passing under the flanges $m''$ on the bars $n''$, Fig. 3, bring the follower-stems down upon the track after they have been raised to give pressure to the brick. The ends of the bars $n''$ are suitably secured in place.

In Fig. 7 I have shown weights $o''$ hung upon pendants from the part N, which weights may be used to aid in holding N in place.

The operation is as follows: The mold-table remains at rest a portion of the time, being driven by a mutilated pinion. When at rest, one of the mold-boxes will be beneath the hopper, and then clay will be fed to such mold-box. When the mold-table again starts, the filled mold-box will pass under the counter-pressure plate F', the surplus clay being swept off. The machinery is so timed that when the mold-box reaches the point for the first pressure at $o'$, Fig. 4, the mold-table will stop while pressure is being given. The mold-table will then again move and will be again brought to rest, and this operation will be continuously repeated. The brick receives three pressures— the first pressure at $o'$, the double pressure at $p'$, and the third pressure at $q'$. When the machinery is fairly in operation, the pressure-levers at these three points will be operated simultaneously by the rotation of the shaft R. The first pressure at the point $o'$ is given through the lever G', the operation of which has been before explained; but it may be further stated that by the raising of the lever G' and the pressure-block K' the follower-stems which rest upon K' will be raised with their followers, giving the brick the first pressure. The second bottom pressure at the point $p'$ is given through the operation of the lever H', one end of which is raised by the rotation of the shaft through the crank $f''$ and pitman $g''$, the raising of which lever also raises the pressure-block M', and with it carries up the follower-stems which are supported on M'. At the same time a top pressure is given by the upper plunger, $H^2$, by the operation of the eccentric $R^3$ on the upper shaft, R'. The third pressure is given by the lever I', which, as before stated, is operated by the rotation of the shaft R through the cam J', acting upon the roller $v'$ at the inner end of the lever I', the raising of which lever raises the pressure-block L'.

The bar D'', with the teeth $h'$ upon the end thereof, serves as a locking device to hold the mold-table at rest while the pressure is being given to the brick. This locking device is operated by the rotation of the mutilated gear-wheel B' and the cam C' and roller $n'$. The latch $j'$ is operated in the same manner and at the same time, being pivoted to B'; but the free end of the latch travels a little faster than its center, so that the hook $m'$ will be brought into position to engage with one of the mold-boxes before the lock has fairly entered the notches $i'$, and this latch will arrest the movement of the mold-table at the proper point, even though its momentum should have a tendency to drive it a little too far.

It has been found in some instances, when the brick is pressed by the flat plate of a follower against a flat surface, that the edges of the same will be less compactly pressed than the body of the brick, and thus made liable to crumble. To obviate this objection I make the face of the plate of the follower $H^2$ convex, as shown, so that in the step giving the top and bottom pressure, a thin upward-projecting fin of clay will be formed on the edges of the brick. The result is that on giving the brick its final pressure the edges of the brick, instead of being weak or crumbling, will be made sharp and as hard and solid as the body.

What I claim is—

1. In a brick-machine, the combination of the series of upward-pressure followers and the intermediate upward and downward pressure followers, whereby successive upward pressures and an intermediate upward and downward pressure are given to the brick, substantially as described.

2. The combination, in a brick-machine, of an intermittently-revolving mold-table and mold-boxes, the downward-pressure followers, the bottom pressure-followers, the connected top and bottom shafting, and the cleaning device mounted on said top shafting, whereby clay in different sets of mold-boxes are pressed and one set of mold-boxes is cleaned at a simultaneous operation, substantially as described.

3. The combination, in a brick-machine, of the revolving mold-table and mold-boxes, the shafting carrying one set of followers, and the cleaning device W, operated by said shaft and provided with a yoke, $W^2$, stem 7, and the crank, crank-pin, and arched standard $W^3$, substantially as described.

4. The combination, in a brick-machine, with an intermittently-revolving mold-table and mold-boxes, the lower and upper shafts, R R', the connecting-gear Q Q', the top plunger, $H^2$, the eccentric and eccentric-strap, and the bottom pressure-followers carried by said mold-table, substantially as and for the purpose described.

5. In a brick-machine, in combination with the rotating table and molds, the top follower, the upper and lower shafts, and the connected gearing, the bottom follower, H, the pressure-lever H', crank $f'''$, and pitman $g''$, whereby the simultaneous top and bottom pressure is effected, substantially as described.

6. In a brick-machine, in combination with the rotating table and molds, the upper shaft and lower shafts, and the connecting gearing, the swab secured to said upper shaft, the follower provided with a head, e, and the supporting track, whereby said swab is pressed down against the head of said follower, substantially as described.

7. The combination, in a brick-machine, of the downward-pressure follower $H^2$, provided with a convex pressure-plate, as shown, and bottom pressure-followers provided with pressure-plates having flat upper surfaces, and a counter-pressure plate, whereby in giving the top and bottom pressure a thin upwardly-projecting fin of clay will be formed on the edges of the brick, which, upon the final upward pressure, will be compressed and form the solid sharp edge of the brick, substantially as described.

In testimony whereof I affix my signature in presence of two witnesses.

WILLIAM LAMPAS GREGG.

Witnesses:
 C. F. NORTON,
 S. E. M. NORTON.